United States Patent [19]

Grimm et al.

[11] Patent Number: 5,061,083
[45] Date of Patent: Oct. 29, 1991

[54] TEMPERATURE MONITORING DEVICE AND THERMOCOUPLE ASSEMBLY THEREFOR

[75] Inventors: Noel P. Grimm, Monroeville; Frank I. Bauer, Perry Township, Lawrence County; Thomas G. Bengel, Plum Boro; Richard E. Kothmann, Churchill Boro; Robert S. Mavretish, New Stanton; Phillip E. Miller, Greensburg; Raymond J. Nath, Murrysville; Robert B. Salton, Plum Boro, all of Pa.

[73] Assignee: The United States of America as represented by the Department of Energy, Washington, D.C.

[21] Appl. No.: 368,459

[22] Filed: Jun. 19, 1989

[51] Int. Cl.$^5$ .......................... G01K 7/02; G01K 3/08; G01K 3/14
[52] U.S. Cl. ...................................... 374/112; 374/166
[58] Field of Search ................. 374/166, 179, 10, 133, 374/112, 115

[56] References Cited

U.S. PATENT DOCUMENTS

| | | | |
|---|---|---|---|
| 3,218,859 | 11/1965 | McBride et al. | 374/112 |
| 3,719,071 | 3/1973 | Hohenberg | 374/112 |
| 3,768,059 | 10/1973 | Day | 374/133 |
| 3,858,433 | 1/1975 | Nearhoot | 374/10 |
| 3,903,743 | 9/1975 | Noller | 374/112 |
| 3,943,766 | 3/1976 | Delany | 374/112 |
| 4,175,418 | 11/1979 | Steffen et al. | 374/112 |
| 4,403,296 | 9/1983 | Prosky | 374/166 |
| 4,433,923 | 2/1984 | Rascati et al. | 374/112 |
| 4,812,051 | 3/1989 | Paulik et al. | 374/10 |
| 4,863,279 | 9/1989 | Markel et al. | 374/115 |

FOREIGN PATENT DOCUMENTS

| | | | |
|---|---|---|---|
| 0025683 | 2/1977 | Japan | 374/115 |
| 0050126 | 4/1980 | Japan | 374/166 |
| 0082422 | 7/1981 | Japan | 374/115 |
| 0135925 | 8/1983 | Japan | 374/115 |
| 0937120 | 9/1963 | United Kingdom | 374/10 |

OTHER PUBLICATIONS

Jackman, V., "Single Cell Differential Thermal Analysis", Instruments & Control Systems, vol. 39, pp. 103–105 (Feb. 1966).

*In-Place Thermal Annealing of Nuclear Reactor Pressure Vessels*, prepared by W. L. server for the U.S. Nuclear Regulatory Commission, NUREG/CR-4212 EGG-M-S-6708, 1985.

*Primary Examiner*—William A. Cuchlinski, Jr.
*Assistant Examiner*—Diego F. F. Gutierrez
*Attorney, Agent, or Firm*—William R. Moser; Judson R. Hightower; Richard E. Constant

[57] ABSTRACT

A temperature monitoring device for measuring the temperature at a surface of a body, composed of: at least one first thermocouple and a second thermocouple; support members supporting the thermocouples for placing the first thermocouple in contact with the body surface and for maintaining the second thermocouple at a defined spacing from the body surface; and a calculating circuit connected to the thermocouples for receiving individual signals each representative of the temperature reading produced by a respective one of the first and second thermocouples and for producing a corrected temperature signal having a value which represents the temperature of the body surface and is a function of the difference between the temperature reading produced by the first thermocouple and a selected fraction of the temperature reading provided by the second thermocouple.

7 Claims, 2 Drawing Sheets

TEMPERATURE MONITORING DEVICE AND THERMOCOUPLE ASSEMBLY THEREFOR

This invention was made under government contract, and the Federal Government may have rights in the subject invention.

CROSS REFERENCE TO RELATED APPLICATIONS

The following applications disclose subject matter which is related to the present invention. All of these applications were filed on Jun. 19, 1989, and are identified by title, Westinghouse Electric Corporation Docket Number and Serial Number:

MODULAR ANNEALING APPARATUS FOR IN SITU REACTOR VESSEL ANNEALING AND RELATED METHOD OF ASSEMBLY - 07/368,454

WATER FILLED TANKS FOR TEMPORARY SHIELDING OF REACTOR VESSEL INTERNALS AND METHOD OF ASSEMBLY - 07/368,433

COFFER DAM FOR TEMPORARY SHIELDING OF REACTOR VESSEL INTERNALS AND METHOD OF ASSEMBLY - 07/368,635

REACTOR VESSEL ANNEALING SYSTEM - 07/368,456

ANNEALING UNIT INSERTION AND REMOVAL SYSTEM-07/368,503

HEATING EQUIPMENT INSTALLATION SYSTEM AND METHOD - 07/368,495

ELECTRIC RESISTANCE HEATER UNIT ASSEMBLY-07/368,432

REACTOR VESSEL NOZZLE THERMAL BARRIER - 07/368,732

BACKGROUND OF THE INVENTION

The present invention relates to a temperature monitoring device and a thermocouple assembly therefor, particularly for use in a system for effecting annealing treatments, particularly for annealing embrittled reactor vessels.

During the normal operation of a nuclear reactor, the reactor vessel, which is normally made of steel and which houses a core containing nuclear fuel, is exposed to intense radiation. Experience has shown that this radiation causes changes in the fine grain structure of the steel walls of the vessel. These structural changes make the walls brittle, a problem commonly referred to as reactor vessel embrittlement. Embrittlement reduces the flexibility of the vessel wall and increases the susceptibility of the vessel wall to fracturing, particularly if subjected to sudden stresses, such as due to operating transient events and pressurized thermal shock events.

Because of this embrittlement phenomenon, the United States Nuclear Regulatory Commission requires that a reactor vessel be removed from service when embrittlement reaches a predetermined stage, thus ending the useful life of this portion of the nuclear power plant. Replacement of such a vessel is extremely expensive because the vessel is built into and is a part of the reactor containment building, thereby making replacement economically impractical.

In order to deal with this problem, it has been proposed to subject such a vessel to annealing in place in order to restore the ductility and toughness of the metal constituting the reactor vessel.

Such treatments can be carried out with the system disclosed in the above-cited copending application Ser. No. 07/368,456, using the heater unit assembly disclosed in the above-cited copending application Ser. No. 07/368,432.

Accurate control of the temperature in each region of the pressure vessel wall is essential to achievement of a proper annealing result. The accuracy of such temperature control is dependent on the accuracy with which the wall temperature can be monitored.

While thermocouples are preferred temperature monitoring devices, they inherently have a certain inaccuracy, which is accentuated in situations where a large temperature gradient exists between the heat sources and the surface being heated.

The temperature reading produced by a thermocouple is dependent on the actual temperature of the thermocouple junction. Since a thermocouple junction must be covered by a metal layer or sheath at the tip, which directly contacts the surface being monitored, and a certain thermal resistance will always exist at the interface between the sheath tip and the surface being monitored, a temperature differential will normally exist between the surface being monitored and the thermocouple junction. Moreover, when a thermocouple is in contact with a surface which faces the heat source, there will be a heat flow from the source directly to the thermocouple.

As a result of all of these factors, the temperature indicated by a thermocouple can exceed the actual temperature of the wall surface being monitored by 50° C. or more at the temperature levels required for the type of annealing process described above.

SUMMARY OF THE INVENTION

It is a primary object of the present invention to improve the accuracy of a temperature monitoring system employing thermocouples.

Another object of the invention is to provide temperature readings which are compensated for errors caused by inherent thermocouple inaccuracies and the existence of a high temperature differential between heat sources and the material being heated.

A further object of the invention is to improve the accuracy of the actual thermocouple reading.

Yet another object of the invention is to improve the reliability with which a defined contact force is maintained between a thermocouple tip and the surface whose temperature is to be monitored.

The above and other objects according to the invention are achieved by temperature monitoring apparatus for measuring the temperature at a surface of a body, comprising:

a support member arranged to be spaced from the surface;

a hollow guide member secured to the support member, the guide member having two opposed, open ends;

a hollow guide tube having a first end disposed at the guide member and a second end disposed at a location remote from the guide member, the interior of the guide tube being in communication with the interior of the guide member and the guide tube being movable relative to the guide member;

a thermocouple assembly extending through, and movable relative to, the guide tube and the guide member and having an end provided with a tip for engaging the body surface;

first biassing means operatively connected between the thermocouple assembly and the guide tube for permitting relative movement between the thermocouple assembly and the guide member; and second biassing means operatively connected between the guide tube and the guide member for resiliently urging the first end of the guide tube toward the body surface while permitting relative movement between the first end of the guide tube and the guide member, wherein the first and second biassing means act in concert for resiliently urging the thermocouple assembly tip toward the body surface.

The above and other objects according to the invention are further achieved by a thermocouple assembly comprising:

a cylindrical metal sheath having an exterior surface and a closed end defining a thermocouple tip; a pair of thermocouple wires housed in the sheath and having ends which are joined together to form a thermocouple junction located adjacent the tip; a convection shield having the form of a hollow cylinder open at at least one end and having interior and exterior cylindrical surfaces, the shield being disposed around the sheath in the vicinity of the tip; and a coating of a material having a low thermal emissivity on the exterior surface of the shield.

The above and other objects according to the invention are further achieved by a temperature monitoring device for measuring the temperature at a surface of a body, comprising:

at least one first thermocouple and a second thermocouple;

means supporting the thermocouples for placing the first thermocouple in contact with the body surface and for maintaining the second thermocouple at a defined spacing from the body surface; and calculating means connected to the thermocouples for receiving signals representative of the temperature readings produced by the thermocouples and for producing a corrected temperature signal having a value which is a function of the difference between the temperature readings produced by the first and second thermocouples.

DESCRIPTION OF THE PREFERRED EMBODIMENTS

Figure 1:
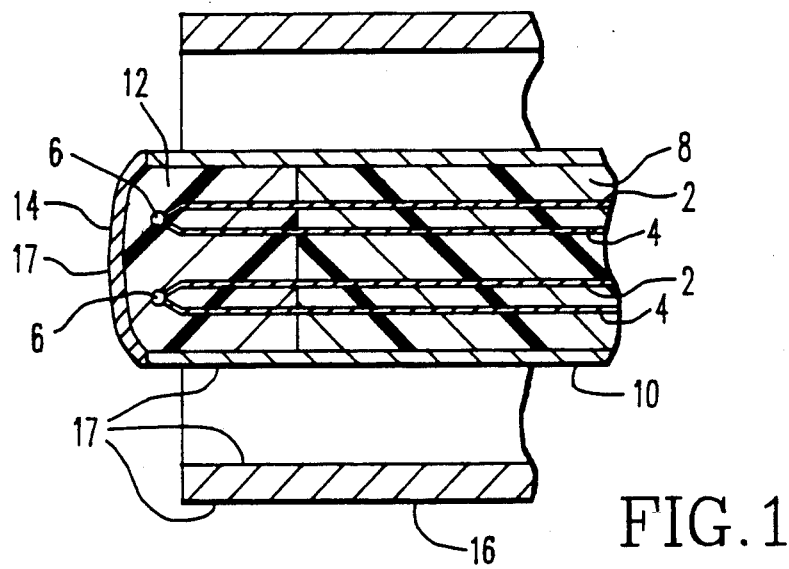
FIG. 1 is a cross-sectional view of the tip portion of a preferred embodiment of a thermocouple according to the present invention.

FIG. 1 is a cross-sectional, detail view of the tip region of one embodiment of a thermocouple constructed to aid in the derivation of accurate temperature readings according to the present invention.

The illustrated device has two ungrounded thermocouples, each composed of a first wire 2 and a second wire 4, wires 2 and 4 being of dissimilar metals, each pair of wires 2, 4 being connected together in a conventional manner by a metal bead 6 which establishes a thermocouple junction. Two thermocouples are provided for redundancy purposes; one thermocouple is employed to produce a temperature indication and if that thermocouple should fail, the other thermocouple would be connected in its place. Wires 2 and 4 are embedded in an insulating mass 8 which insulates wires 2, 4 from one another and from a surrounding stainless steel sheath 10.

One aspect of the present invention relates to applicants' recognition that the accuracy of the temperature reading produced by a thermocouple is a function of the distance separating the junction bead 6 from the surface whose temperature is being monitored; the smaller this distance, the closer will be the temperature reading produced by the thermocouple to the actual temperature of the surface. In order to minimize this distance, according to the present invention, the tip of the thermocouple is formed by removing a portion of the insulating mass 8 originally provided and cutting away the thermocouple junctions, if they were previously formed, to expose wires 2, 4. Then, junction beads 6 are formed and the region bordered by mass 8 and sheath 10 is backfilled with a mass 12 of the insulating material, possibly in powder form. Sufficient insulating material is introduced to cover beads 6 with an insulating layer which is as thin as possible while providing adequate electrical insulation for beads 6. The resulting assembly is then covered with a thin conductive sheath tip layer 14, for example by welding, to fully encase the thermocouples.

All materials of the thermocouple assembly thus described can be those which are conventionally used in the manufacture of thermocouples.

The resulting assembly is surrounded by a convection shield 16, which is also conventional in the art. Shield 16 is dimensioned so that the tip of the thermocouple assembly projects axially beyond the end of shield 16 by a small distance, typically of the order of 3.8 mm. Sheath 10 may have a diameter of the order of 3.2 mm and shield 16 may have a diameter of the order of 13 mm. The thermocouple assembly can be prepared in the manner described above to achieve a spacing between beads 6 and the outer surface of layer 14 of the order of 1.5 mm with layer 14 having a thickness of the order of 0.5 mm.

In accordance with the invention, the accuracy of the resulting temperature readings can be enhanced by coating the outer surfaces of sheath 10 and layer 14 and the inner and outer surfaces of convection shield 16 with respective coatings 17 of a low emissivity material, which may be formed by applying a layer of gold paint, followed by heat treatment thereof. It has been found that the application of a layer of such a material increases the thermal reflectance of the coated surfaces and thus reduces the direct influence of the surrounding heat source on the temperature reading produced by the thermocouples. Preferably use is made of a coating material which produces a layer having a relative emissivity of no greater than 0.05. The preferred material is gold because of its ability to resist degradation at high temperatures. When the layer is formed of gold paint, the resulting layer will be constituted by essentially pure gold. Such a layer can have a thickness of the order of 0.025 to 0.05 mm.

Figure 2:
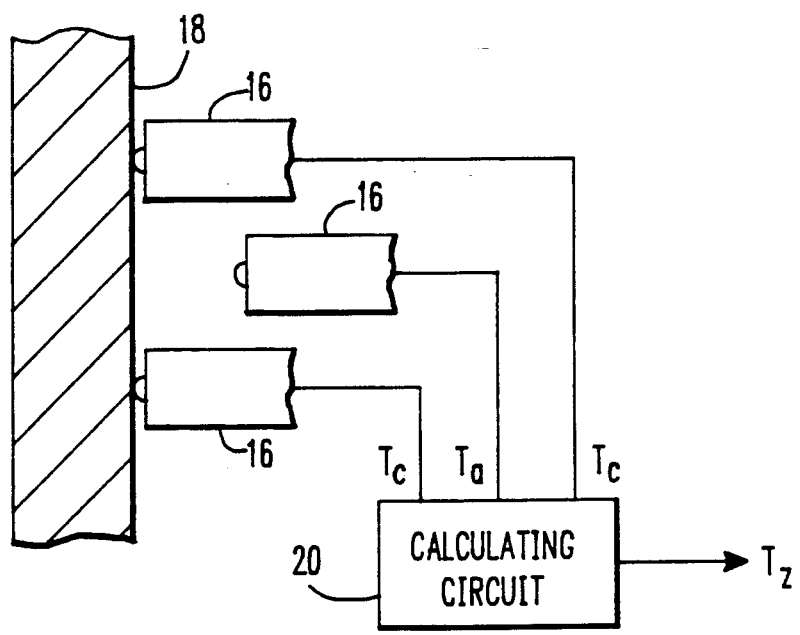
FIG. 2 is a simplified pictorial view of a temperature monitoring device according to the invention.

According to a particular feature of the present invention, the accuracy of the temperature measurement achieved by such thermocouples is increased by providing, as shown in FIG. 2, an array of two or three thermocouples, with one of the thermocouples being spaced from the surface 18 of the body whose temperature is being monitored and the other thermocouple or thermocouples being disposed, in contact with surface 18. The thermocouple which is spaced from surface 18 is positioned in the gap between surface 18 and the heat source.

Investigations have revealed that a corrected temperature indication, which conforms more closely to the true temperature of surface 18, can be achieved by combining the readings produced by the thermocouple or thermocouples in contact with surface 18 and that produced by the thermocouple which is spaced from surface 18, according to the following equation:

$$T_Z = (T_c - KT_a)/(1-K)$$

where:

$T_Z$ = corrected surface temperature reading;
$T_c$ = temperature indication produced by thermocouple in contact with surface 18 or average of temperature readings produced by two thermocouples in contact with surface 18;
$T_a$ = temperature reading produced by thermocouple spaced from surface 18; and
K = correction factor.

A corrected temperature indication can be obtained by supplying the temperature signals provided by the thermocouples to a calculating circuit 20 which generates a signal representative of the corrected temperature, $T_Z$, in accordance with the above equation.

The correction factor K is a function of the temperatures employed in the particular annealing procedure and the structure of the tip of each thermocouple and its value may be determined experimentally, based on a comparison of the readings produced by an assembly having the form shown in FIG. 2, and readings produced by a test thermocouple which is placed in contact with surface 18 in a manner which causes that thermocouple to produce a reading which closely approximates the actual temperature of the wall surface. The test thermocouple is attached to the wall surface in a manner which would not be practical in the context of an annealing procedure. Such a test thermocouple can be attached to a wall surface in the manner disclosed in a copending application filed by Ronald Fayfich, entitled THERMOCOUPLE INSTALLATION, Ser. No. 07/368,496.

While K can take on a variety of values, it has been found that, in an arrangement of the type described above, in an annealing system which heats surface 18 to typical annealing temperatures, K may have a value of the order of 0.44.

An arrangement of the type illustrated in Figure 2 and described above has been found to produce temperature indications which correlate closely with the true wall surface temperature, even under difficult heat transfer conditions in which heaters surround the thermocouples and are disposed so that the thermocouple tips are located between the heaters and the wall surface whose temperature is being monitored. The tip of the thermocouple which is spaced from wall surface 18 can be located at half the distance between surface 18 and the heat emitting surfaces of the heaters. According to one arrangement which is presently contemplated, that tip of that thermocouple would be about 2.5 cm from surface 18.

The invention further provides a novel support structure which is particularly suitable for those thermocouples which are to be brought into contact with a surface whose temperature is to be monitored. During a heat treatment process, such as an annealing process, thermal expansion will vary the spacing between the structure supporting a thermocouple and the surface to be monitored. Since the accuracy of the temperature reading derived from the thermocouple is dependent on retention of contact between the thermocouple tip and the surface, and maintenance of a defined contact pressure therebetween, the thermocouple must be mounted in a manner to accommodate such thermal expansion movements.

In addition, when a thermocouple is brought to a surface to be monitored through a guide tube which follows a curved path, the thermocouple may be called upon to move relative to the guide tube while following thermal expansion movements of the wall whose temperature is being monitored. Such movements may cause the thermocouple sheath to rub against the guide tube, resulting in bending of the sheath and loss of contact between the thermocouple tip and the surface being monitored.

Figure 3:
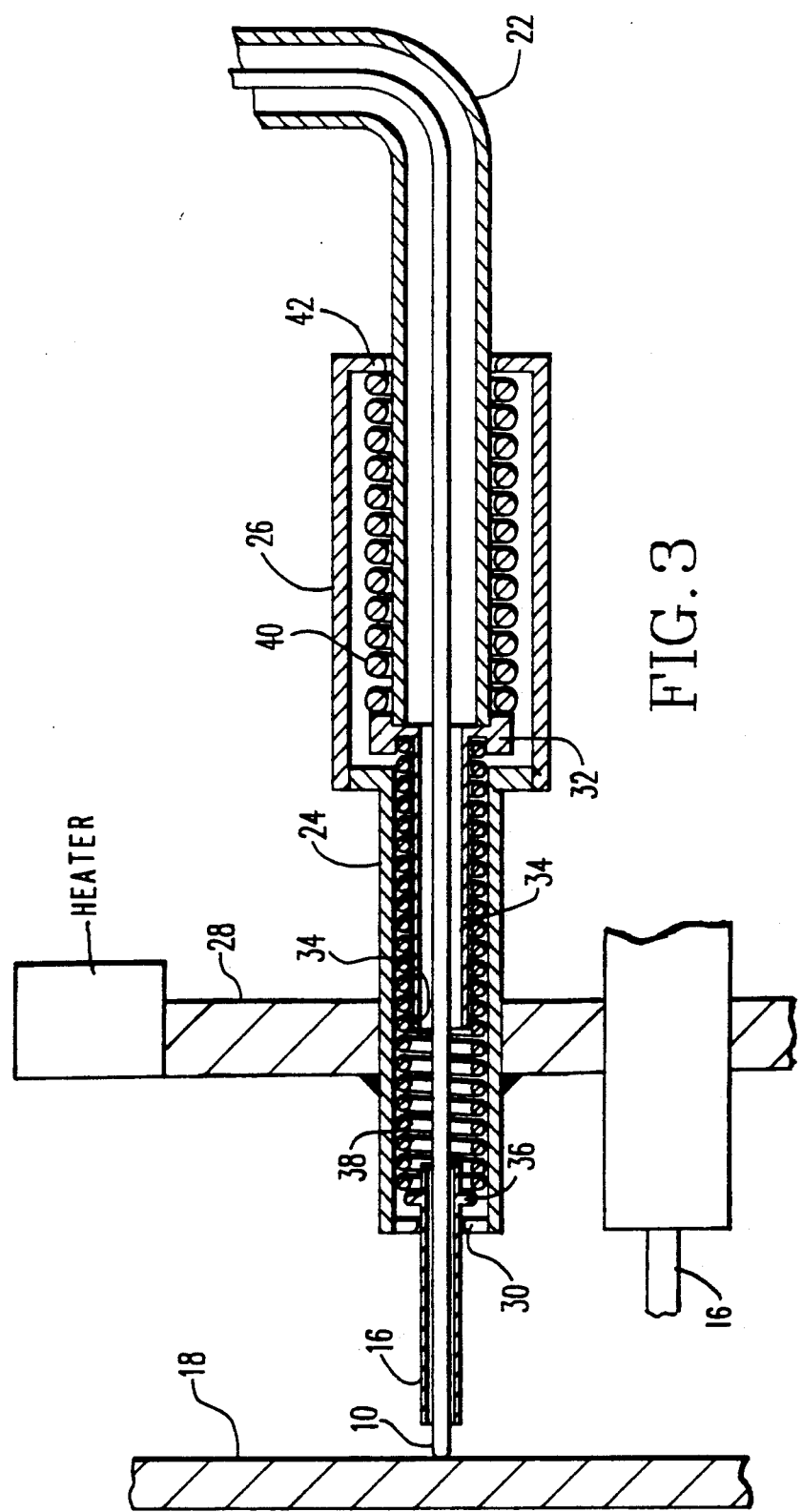
FIG. 3 is a cross-sectional view of a preferred embodiment of a thermocouple assembly according to the invention.

FIG. 3 illustrates a preferred embodiment of an arrangement according to the present invention for reliably maintaining a selected contact force between a thermocouple tip and a wall surface whose temperature is to be monitored. In accordance with standard practice, thermocouple sheath 10 is guided from a control station through a guide tube 22 and two cylinders 24 and 26 to surface 18. Cylinder 24 is secured to a wall 28 which is located radially inwardly of surface 18 and supports the heaters with which an annealing operation is performed. Cylinder 26 is located radially inwardly of wall 28 and is fixed to cylinder 24.

The outer end of cylinder 24 is provided with a cap 30 which is preferably removable to facilitate maintenance, repair and replacement of various operating parts. The end of guide tube 22 is fixed to a disc member 32 having an axially projecting portion 34. Convection shield 16 extends into cylinder 24 and is provided, within cylinder 24, with a radially projecting flange 36. In addition, convection shield 16 is secured to sheath 10.

Within cylinder 24 there is disposed a first spring 38 which is compressed between flange 36 and disc member 32. A second compression spring 40 is disposed in cylinder 26 and is compressed between disc member 32 and an inwardly directed flange 42 provided at the rear end of cylinder 26. Spring 38 and spring 40 apply a force which maintains the tip of sheath 10 in contact with surface 18, with a defined contact force, even if thermal expansion effects should create some change in the distance between surface 18 and wall 28.

If, during an annealing procedure, sheath 10 should be forced against guide tube 22, thereby restricting free movement of sheath 10, guide tube 22 can move, together with disc member 32, relative to cylinder 26. Springs 38 and 40 allow this movement to occur, while assuring that the desired contact is maintained between the tip of sheath 10 and surface 18. By allowing guide tube 22 a certain of freedom of movement, crushing and bending of sheath 10, if sheath 10 should rub against tube 22, is prevented. This is particularly advantageous in high temperature annealing operations because at the temperatures employed for such operations, the coefficient of friction between the metal surfaces of sheath 10 and tube 22 increases substantially.

Preferably, spring 40 has a higher spring constant than spring 38. For example, the spring force of spring 40 can be two times that of spring 38. Thus, initial movements of the tip of sheath 10 are accommodated by spring 38 and spring 40 normally. If rubbing or binding occurs between sheath 10 and tube 22, the spring force of springs 38 and 40 in combination move the guide tube 22 to maintain the proper holding force for holding the tip of sheath 10 in contact with surface 18. It will further be noted that the axially extending portion 34 of disc member 32 acts on convection shield 16 as a mechanical stop to limit the movement of convection shield 16 relative to guide tube 22. With convection shield 16 in contact with part 34, spring 40 takes over the function of holding the tip of sheath 10 in contact with surface 18.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A temperature monitoring device for measuring the temperature at a surface of a body, comprising
   at least one first thermocouple and a second thermocouple;
   means supporting said thermocouples for placing said first thermocouple in contact with the body surface and for maintaining said second thermocouple at a defined spacing from the body surface; and
   calculating means connected to said thermocouples for receiving individual signals each representative of the temperature reading produced by a respective one of said first and second thermocouples and for producing a corrected temperature signal having a value which represents the temperature of the body surface and is a function of the difference between the temperature reading produced by said first thermocouple and a selected fraction of the temperature reading provided by said second thermocouple.

2. A device as defined in claim 1 wherein said calculating means produce a corrected temperature signal according to the following equation:

$$T_Z = (T_c - KT_a)/(1-K),$$

where
   $T_Z$ is the corrected temperature represented by the corrected temperature signal,
   $T_c$ is the temperature reading produced by said first thermocouple,
   $T_a$ is the temperature reading produced by said second thermocouple, and
   K is an experimentally derived constant.

3. A device as defined in claim 2 wherein K has a value at least approximately equal to 0.44.

4. A device as defined in claim 1 wherein there are two said first thermocouples both supported by said means supporting said thermocouples for the placement of both of said first thermocouples in contact with the body surface.

5. A device as defined in claim 4 wherein said second thermocouple is located between said two first thermocouples.

6. A device as defined in claim 4 wherein the value of the corrected temperature signal is a function of the difference between the average of the temperature readings produced by said two first thermocouples and the temperature reading produced by said second thermocouple.

7. A device as defined in claim 1 in combination with a solid body having a surface whose temperature is to be measured, wherein said firsts thermocouple is in contact with said surface and said second thermocouple is spaced from said surface.

* * * * *